United States Patent
Boufounos et al.

(10) Patent No.: US 9,778,354 B2
(45) Date of Patent: Oct. 3, 2017

(54) METHOD AND SYSTEM FOR CODING SIGNALS USING DISTRIBUTED CODING AND NON-MONOTONIC QUANTIZATION

(71) Applicant: Mitsubishi Electric Research Laboratories, Inc., Cambridge, MA (US)

(72) Inventors: Petros Boufounos, Winchester, MA (US); Diego Valsesia, Borgomanero (IT)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 15/245,381

(22) Filed: Aug. 24, 2016

(65) Prior Publication Data

US 2017/0048537 A1    Feb. 16, 2017

Related U.S. Application Data

(63) Continuation-in-part of application No. 14/822,212, filed on Aug. 10, 2015, now Pat. No. 9,501,717.

(51) Int. Cl.
*G06K 9/36* (2006.01)
*G01S 13/90* (2006.01)
(Continued)

(52) U.S. Cl.
CPC ........... *G01S 13/90* (2013.01); *G06K 9/36* (2013.01); *G06K 9/481* (2013.01); *G06T 1/0007* (2013.01);
(Continued)

(58) Field of Classification Search
CPC ...... G06K 9/36; G06K 9/4647; G06K 9/4652; G06K 9/481; G06K 9/6202; G06K 9/6215;
(Continued)

(56) References Cited

U.S. PATENT DOCUMENTS

| | | | |
|---|---|---|---|
| 7,392,424 B2 | 6/2008 | Ho et al. | |
| 8,023,563 B2 * | 9/2011 | Vella | H04N 19/176 375/240.22 |

(Continued)

OTHER PUBLICATIONS

Liangjun Wang; Xiaolin Wu; Guangming Shi, "Binned Progressive Quantization for Compressive Sensing," Image Processing, IEEE Transactions on , vol. 21, No. 6, pp. 2980,2990, Jun. 2012, doi: 10.1109/TIP.2012.2188810.

*Primary Examiner* — Jose Couso
(74) *Attorney, Agent, or Firm* — Gene Vinokur; James McAleenan; Hironori Tsukamoto

(57) ABSTRACT

A decoder includes a memory storing a map of a space of encoded values. The map includes a plurality of cells partitioning the space, such that each cell encloses a cluster of encoded values and quantizes the cluster of encoded values to a quantized encoded value. Each cell is identified by a label selected from a finite alphabet, such that multiple cells in the map are identified by the same label, and the cells are labeled such that a pair of cells identified by the same label does not share a common boarder. The decoder also includes a receiver to receive from an encoder a label of a cell enclosing an encoded value on the map of the space and a processor to estimate the encoded value using side information to produce an estimation of the encoded value, to select a cell identified by the received label on the map of the multi-dimensional space that is the closest to the estimation of encoded value, and to determine the encoded value as the quantized encoded value of the selected cell.

20 Claims, 14 Drawing Sheets

(51) Int. Cl.
*G06T 1/00* (2006.01)
*G06K 9/48* (2006.01)
*H04N 19/124* (2014.01)
*H04N 19/30* (2014.01)

(52) U.S. Cl.
CPC ......... *H04N 19/124* (2014.11); *H04N 19/395* (2014.11); *G06T 2207/10036* (2013.01); *G06T 2207/10044* (2013.01)

(58) Field of Classification Search
CPC .. G06K 9/6218; G06K 9/6857; G06T 1/0007; G06T 5/001; G06T 5/007; G06T 5/10; G06T 9/00; G06T 2207/10044; G06T 2207/20016; G06T 2207/20148; G06T 9/008; H04N 19/10; H04N 19/103; H04N 19/124; H04N 19/126; H04N 19/132; H04N 19/136; H04N 19/146; H04N 19/154; H04N 19/172; H04N 19/184; H04N 19/186; H04N 19/61; H04N 19/63; H04N 19/513; H04N 19/94; H04K 1/00; H04L 45/00; H04L 45/04; H04L 45/50; H04L 45/56; H04L 69/40; H03M 7/24; H03M 7/3046; H03M 7/3059; H03M 17/30247; H03M 17/30256; G01S 13/90
See application file for complete search history.

(56) References Cited

U.S. PATENT DOCUMENTS

| | | |
|---|---|---|
| 8,768,075 B2 | 7/2014 | Boufounos et al. |
| 8,837,727 B2 | 9/2014 | Boufounos et al. |
| 9,177,388 B2 * | 11/2015 | Tonisson ............... G06T 7/2033 |
| 2010/0114871 A1 * | 5/2010 | Cheong ............... G06F 17/3053 |
| | | 707/719 |
| 2013/0046793 A1 * | 2/2013 | Reznik ............... G06F 17/30961 |
| | | 707/797 |

* cited by examiner

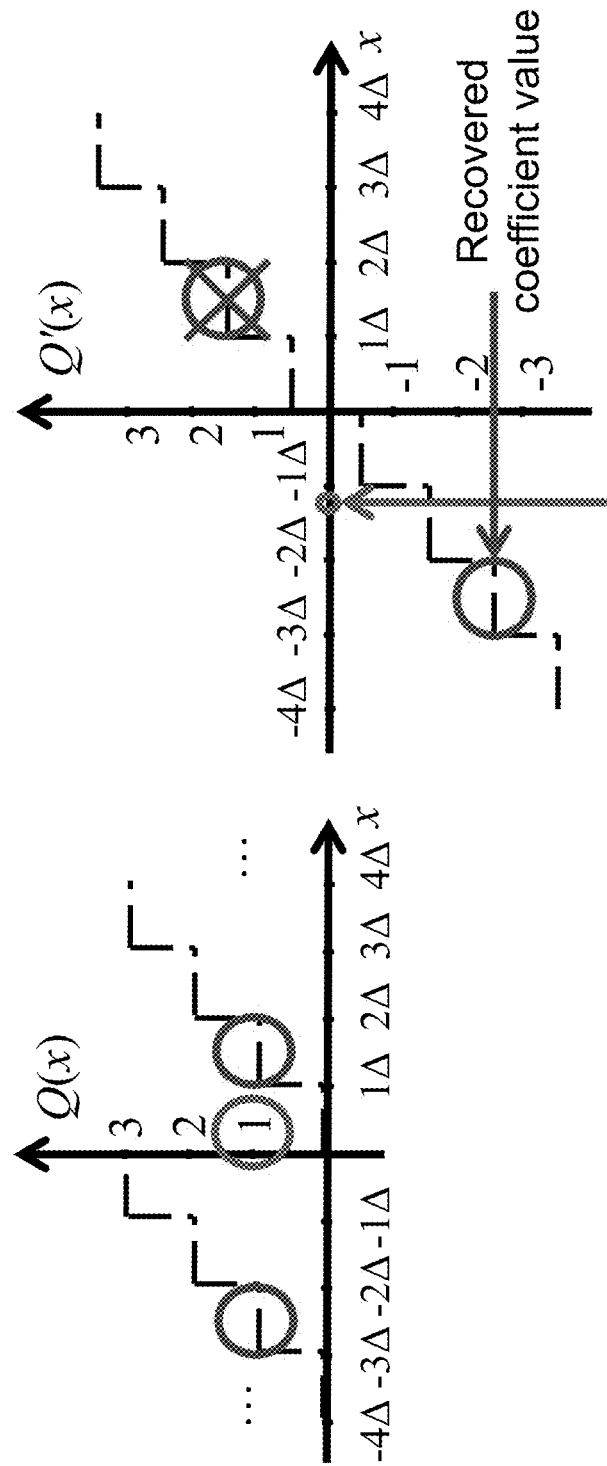

METHOD AND SYSTEM FOR CODING SIGNALS USING DISTRIBUTED CODING AND NON-MONOTONIC QUANTIZATION

RELATED APPLICATION

This application is a continuation-in-part of U.S. application Ser. No. 14/822,212, "Method and System for Coding Signals using Distributed Coding and Non-Monotonic Quantization," Boufounos et al., filed Aug. 10, 2015.

FIELD OF THE INVENTION

This invention relates generally to signal processing, and more particularly to coding uncompressed signals, wherein the coding includes encoding and/or decoding.

BACKGROUND OF THE INVENTION

Lossy compression is widely used in signal processing and signal transmission. There are several applications of lossy signal compression, such as the compression of camera images, multispectral images, hyperspectral images, and synthetic aperture radar (SAR) data, to name a few. In such applications, the goal is to encode the signal with an encoder and use a small number of bits to represent the signal, such that the signal can be transmitted at a lower bit rate, at the expense of some distortion in the signal, i.e., there is some loss of information duting the compression, hence the compressions is lossy.

FIG. 1A is a block diagram of a conventional coding method and system. The system includes an encoder 110 and a decoder 120. The encoder takes as input an uncompressed signal 101 and produces a compressed signal 111. Lossless transmission 115 is used to transmit the compressed signal to the decoder, which produces a decompressed signal 121, which is an estimate of the uncompressed signal.

The goal of the encoder, i.e., the system or method performing the compression, is to produce a bitstream, i.e., a sequence of bits that represent the signal with as little distortion as possible for a given bit-rate. Alternatively the encoder might produce a bitstream with as few bits as possible given the distortion that can be tolerated by the application.

The decoder, i.e., the system or method decompressing the signal, uses the sequence of bits produced by the decoder to recover the original signal with as little distortion as possible for the given bit rate.

Most commonly used encoding methods use two techniques: prediction followed by transformation. The prediction tries to predict parts of the signal being encoded, e.g., blocks of an image, using information from other parts of a signal or other signals. Therefore, the encoder includes prediction parameters in the bitstream, i.e., how the prediction was performed, e.g., which part of the signal was used and which prediction method was used, so that the decoder can also perform the same prediction step.

Because the prediction is typically imperfect, there is a prediction residual that is also encoded. The hope is that the residual is easy to encode, so that when the rate used to transmit the prediction parameters and the rate used to code the residual is lower than simply encoding the signal without prediction.

To encode the residual, the encoder first uses a transformation, which maps the signal to a different domain that is simpler to encode. The goal of the transformation is to expose the structure of the signal such that the encoding requires a small number of bits. For example, image and video compression might transform the residual using a discrete cosine transform (DCT) because it is easier to encode the DCT coefficients of the residual than the residual itself, even though they both represent the same information. The reason is that the DCT concentrates the information to a few significant coefficients that are encoded.

Those two techniques are typically combined with other techniques that refine the performance of the encoder, e.g., by selecting how many bits of the bitstream to use for each part of the signal so that the trade off between rate and distortion is optimally traded throughout the signal.

Unfortunately, those encoding techniques produce very complex encoders, and, typically require very simple decoders. This is acceptable in many applications, such as image and video encoding. There, the encoder has significant resources available, while the decoder, at the playback device, has limited resources. However, in applications in which the encoder has to be limited computationally, this becomes problematic.

For example, the computational resources available for satellite image or radar signal compression is very limited due to restrictions on the processors and power that can withstand space travel conditions. Similarly, in applications, such as hyperspectral or multispectral image compression, the amount of data that need to be used for prediction and transformation require memory storage prohibitive for the state of the art portable devices. Even modern video compression in mobile devices, e.g., mobile telephones and other handheld devices, uses a separate processor to minimize the load on the main processor, and to reduce power consumption. For many of such applications, the computational resources and power available to the decoder are essentially unlimited. For example, a decoder of satellite data might be part of a large datacenter with significant storage and several processing nodes available for decoding. Hence, it makes sense to decrease the complexity of the encoder at the expensense of more complex decoders.

An alternative approach is distributed compression, also known in the art as compression with side information. This class of methods does not perform the prediction step at the encoder. Instead of the encoder predicting the signal and encoding the residual, the encoder assumes that the decoder is capable of preforming some prediction about the signal from side information available at the decoder. Because the prediction is based on the side information, it can be imperfect, and, therefore, the decoding can incur significant distortion. Thus, the role of the encoder is to transmit a bitstream that can be used with the prediction at the decoder to reduce the distortion of the decoded signal.

In practice, all practical coding with side information methods attempt to correct a bitstream. Specifically, the prediction method at the decoder attempts to predict a predicted bitstream that, when subsequently decoded further, can produce the decompressed signal. The encoder attempts to generate a transmitted bitstream that can correct the errors in the predicted bitstream to produce an error-free bitstream. The error-free bitstream is subsequently used for the reconstruction.

To encode the transmitted bitstream, the encoder still performs the transformation step but then uses error correcting codes (ECC) to encode information. Because the bitstream is available at the decoder through the prediction, it is only necessary to transmit a small amount of error-correcting information generated by the ECC, known as syndromes. Because the prediction step is performed at the decoder, the encoder complexity is significantly reduced. On the other hand, the decoder complexity increases significantly, making compression with side information applicable when the decoder can be a more powerful system than the encoder.

FIG. 1B shows a method and system for coding using syndromes and side information. The system includes an encoder 210 that takes input an uncompressed signal 201 to produce a compressed signal 211 or syndrome, which is transmitted losslessly 115 to a decoder 220, which produces a decompressed signal 221.

Although compression with side information reduces the load at the encoder, it still requires the transformation step in addition to the encoding step, which, in some cases, can be computationally complex.

Furthermore, because all practical compression methods use error correction and decode the bitstream separately, those methods ensure that the bitstream can be accurately corrected. If the methods fail to transmit sufficient error correcting information, then the decoding can fail and recover a signal that is unrelated to the original signal. In many cases, failure in the error correction might result to a bitstream that cannot be decoded.

For this reason, most practical methods transmit a larger number of syndrome bits than necessary, to guarantee the correction works, thus wasting bandwidth. In addition, the extra bits do not improve the distortion performance of the compression method. Alternatively, a feedback-based rate control system can be implemented on top of the compression system, which attempts decoding and, when unsuccessful, require more syndrome bits. This requires both real-time decoding and two-way communication between the encoder and the decoder, which is not possible in many applications.

SUMMARY OF THE INVENTION

One embodiment discloses a decoder that includes a memory storing a map of a space of encoded values, wherein the map includes a plurality of cells partitioning the space, such that each cell encloses a cluster of encoded values and quantizes the cluster of encoded values to a quantized encoded value, wherein each cell is identified by a label selected from a finite alphabet, such that multiple cells in the map are identified by the same label, and wherein the cells are labeled such that a pair of cells identified by the same label does not share a common boarder; a receiver to receive from an encoder a label of a cell enclosing an encoded value on the map of the multi-dimensional space; and a processor to estimate the encoded value using side information to produce an estimation of the encoded value, to select a cell identified by the received label on the map of the space that is the closest to the estimation of encoded value, and to determine the encoded value as the quantized encoded value of the selected cell.

Another embodiment discloses a method that includes estimating a transmitted encoded value to produce an estimated value, wherein the estimating uses side information; locating the estimated values on a map of a multi-dimensional space of encoded values, wherein the map includes a plurality of cells partitioning the multi-dimensional space, such that each cell encloses a cluster of encoded values and quantizes the cluster of encoded values to a quantized encoded value, wherein each cell is identified by a label selected from a finite alphabet, such that multiple cells in the map are identified by the same label, and wherein the cells are labeled such that a pair of cells identified by the same label does not share a common boarder; receiving a label of a cell transmitted over a communication channel; selecting on the map a cell that is closest to the located estimated value among cells having the transmitted label; and selecting a quantized value of the second cell as a decoded value of the signal. The steps of the method are performed by a processor of a decoder.

Another embodiment discloses an encoder, including a processor to determine an encoded value; a memory storing a map of a multi-dimensional space of encoded values, wherein the map includes a plurality of cells partitioning the multi-dimensional space, such that each cell encloses a cluster of encoded values and quantizes the cluster of encoded values to a quantized encoded value, wherein each cell is identified by a label selected from a finite alphabet, such that multiple cells in the map are identified by the same label, and wherein the cells are labeled such that a pair of cells identified by the same label does not share a common boarder; and a transmitter to transmit to a decoder a label of the cell enclosing the encoded value on the map of the multi-dimensional space.

BRIEF DESCRIPTION OF THE DRAWINGS

FIGS. 3A-3B are schematics of recovering missing information from a prediction in a decoder according to embodiments of the invention;

DETAILED DESCRIPTION OF THE PREFERRED EMBODIMENTS

Non-Monotonic Quantization for Compression with Side Information

Compression Method and System

Figure 1A:
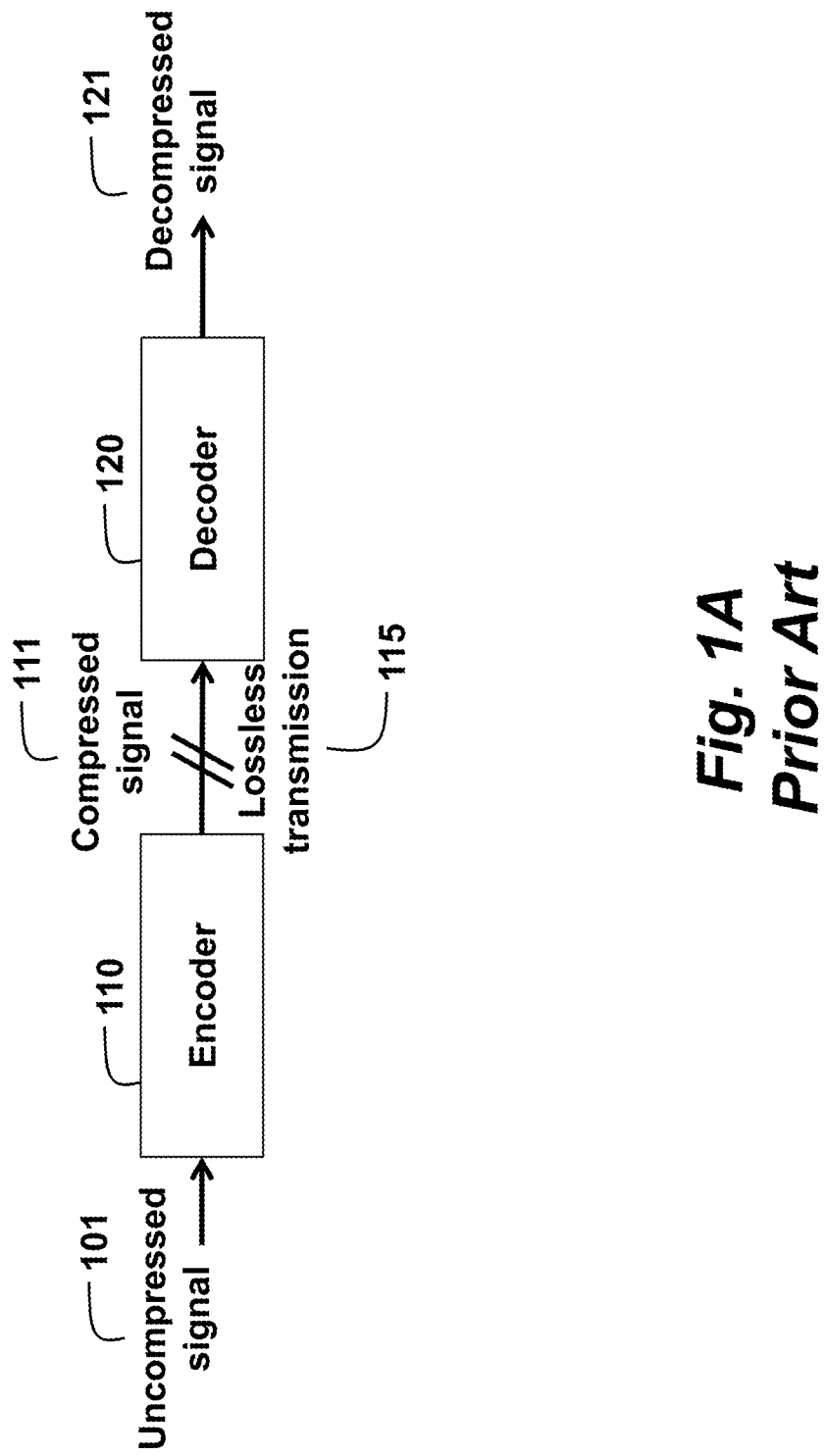
FIG. 1A is a high level block diagram of a conventional compression method and system.
Figure 1B:
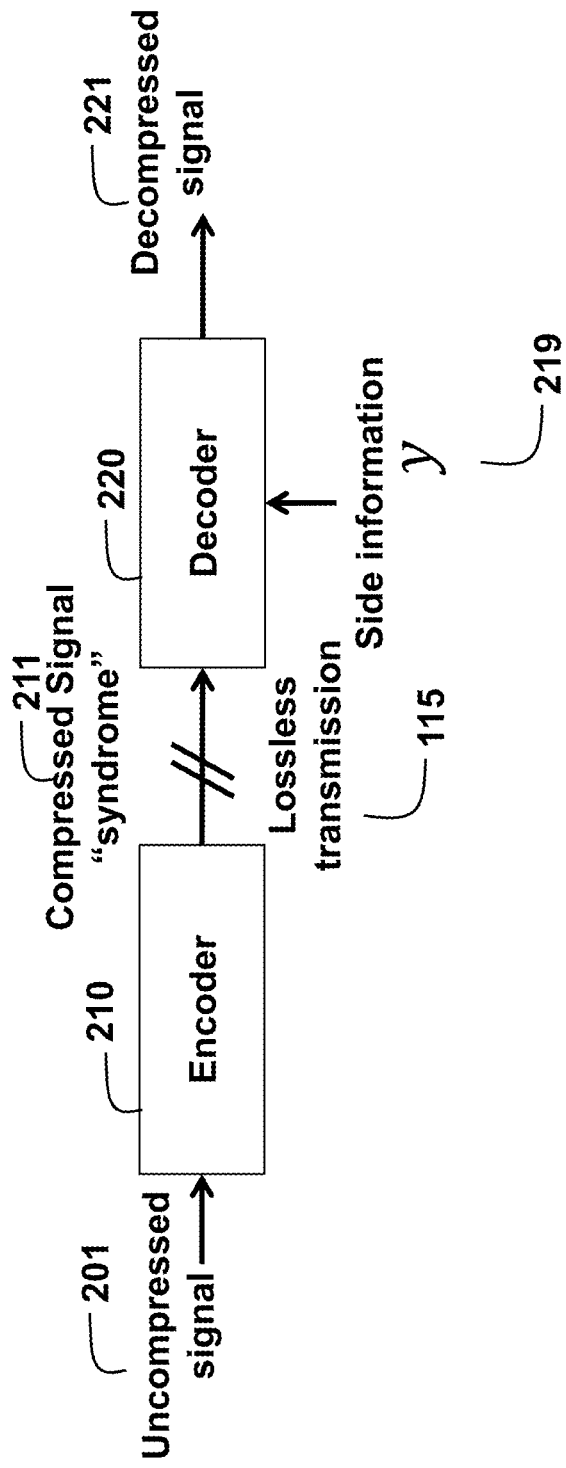
FIG. 1B is a high level block diagram of a conventional compression method and system using side information.
Figure 1C:
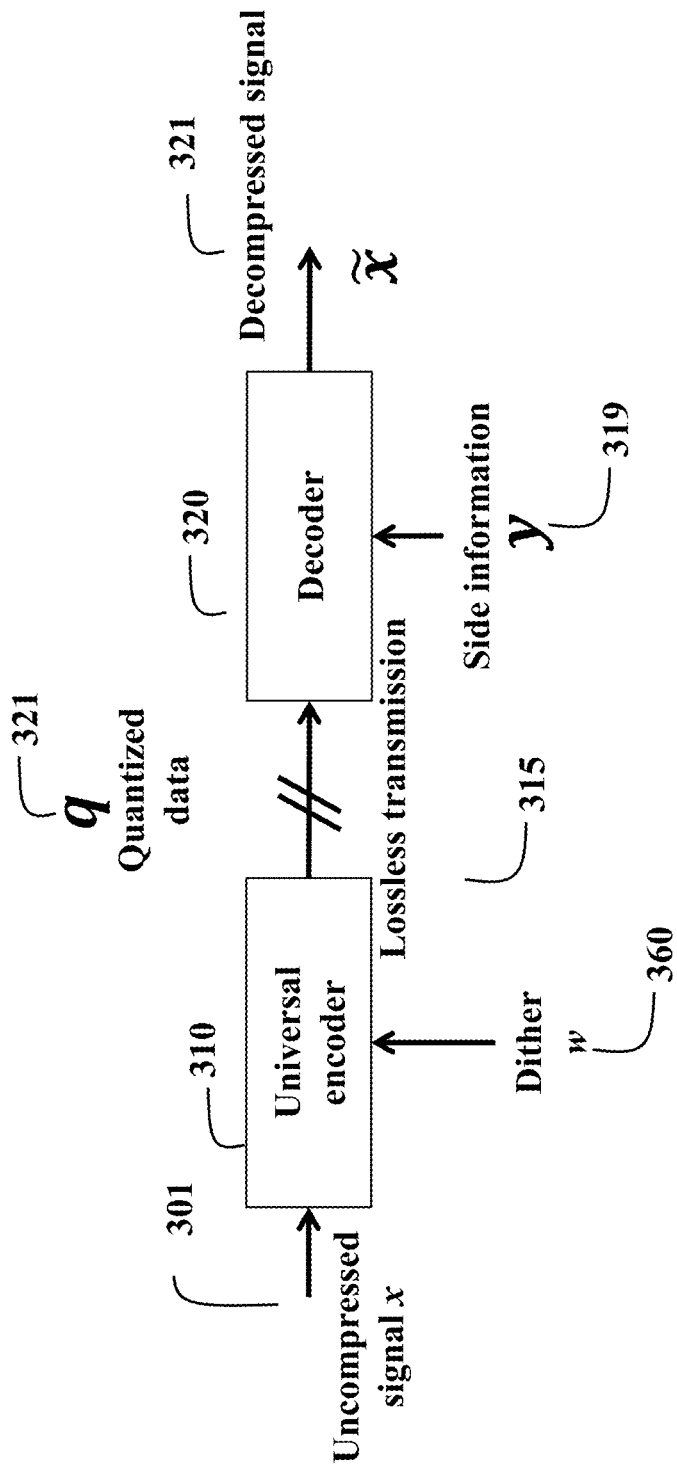
FIG. 1C is a high level block diagram of a compression method and system according to embodiments of the invention.

FIG. 1C shows a method and system for compressing according to some embodiments of the invention. The system includes an encoder 310 that takes an uncompressed signal 301 as input to produce quantized measurements 321, which can be transmitted losslessly 315 to a decoder 320. The decoder decodes the quantized measurements using side information y 319 to produce a decompressed signal 321.

Overview

Encoder

The role of the universal encoder is to encode the signal x 301 to a bitstream that is the compressed signal 321. The encoder assumes that the decoder is able to use the side information y 319 form a prediction of x, denoted $\hat{x}$, which can include some distortion.

To encode the uncompressed x, the encoder 310 obtains linear measurements of x, to which dither w 360 is added, and then quantized using non-monotonic quantization to produce quantized data q 321, i.e., the compressed signal. As described below, non-monotonic quantization can be though of as removing superfluous information, e.g., one or more most significant bits, from the quantized measurements that can recovered by the decoder 320.

Decoder

The decoder uses the side information 319 to form $\hat{x}$, which is an estimate of x. Next, the decoder obtains linear measurements of $\hat{x}$ and adds the dither w. The result is quantized with a non-monotonic quantizer, thus producing a prediction of the information missing from q, which is the encoding of x. The missing information is added to q to produce a set of quantized measurements $\tilde{q}$. These measurements are used, together with the prediction $\hat{x}$ of x, and any other prior knowledge about x, to reconstruct $\tilde{x}$, an estimate of x with significantly less distortion than $\hat{x}$.

Encoding

Figure 2A:
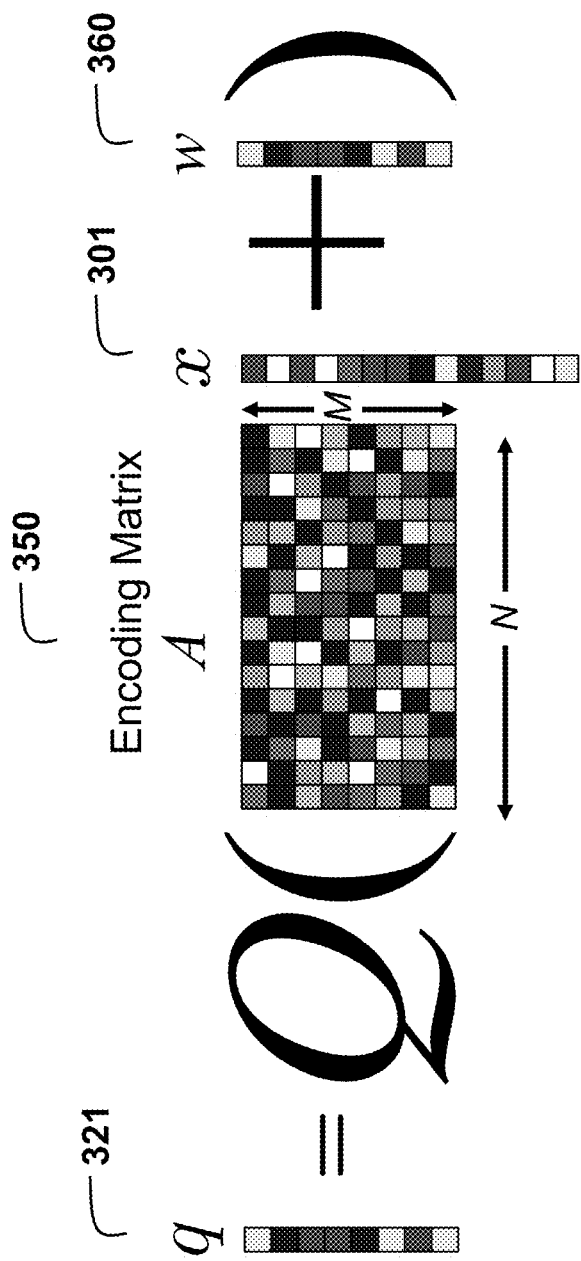
FIG. 2A is a schematic of an operation of a universal encoder using an encoding matrix according to embodiments of the invention.

FIG. 2A shows the encoding schematically. The uncompresed signal x 301 has N dimensions, which can be real or complex. One embodiment uses an encoding matrix A 350 with dimensions M×N to obtain M linear measurements Ax of the signal x. The matrix A may be real or complex. In preferred embodiments, real signals are measured using real matrices, and complex-valued signals are measured using complex-valued matrices. However, in some embodiments the real signal can be measured using a complex-valued matrix, and vice versa.

The matrix can be generated in a number of ways. In the preferred embodiments, the matrix is generated randomly. For example, entries in the matrix A can be a realization of random variables drawn from an i.i.d. uniform, Rademacher, Gaussian, or sub-Gaussian distribution. Alternatively, rows of the matrix A can be uniformly sampled from a unit sphere in N dimensions.

In another embodiment, the matrix A can be a discrete Fourier transform (DFT) matrix, or a Hadamard transform matrix, or a discrete sine or cosine transform (DCT or DST) matrix, or any of the above matrices with columns permuted and some of rows removed. In another embodiment, the matrix can be a low density parity check code (LDPC) matrix, or an expander graph matrix. The advantage of using structured matrices (DFT, DCT, DST, Hadamard) or sparse matrices (LDPC, expander graphs) is that these matrices require less memory and processing, thus reducing the complexity of the encoder.

Subsequently, the dither w 360 is added to the linear measurements as Ax+w and the result is quantized using a non-monotonic B bit scalar quantizer with quantization parameter Δ. In the preferred embodiment the dither is randomly generated from a uniform distribution with support Δ or $2^B\Delta$. Note that because this is a scalar quantizer and the input is a vector, the quantizer function is applied element-wise to each of the vector elements.

Figure 2B:
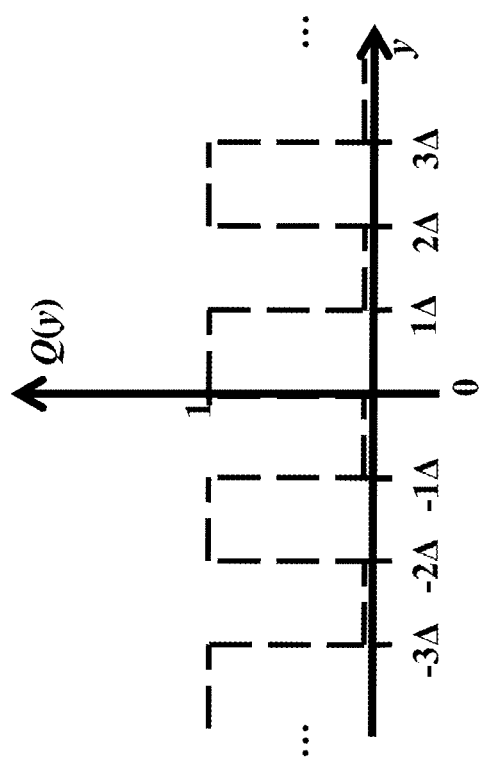
FIGS. 2B-2C are schematics of scalar quantization according to embodiments of the invention.
Figure 2C:
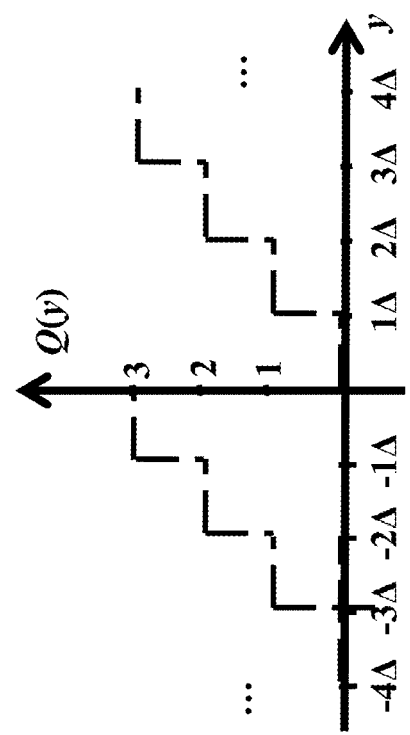

FIGS. 2B and 2C schematically show a B bit scalar quantizer respectively for the case of B=1 and B=2. In particular, the scalar quantization function is periodic with period $2^B$ and has $2^B$ distinct output levels, which can be represented using B bits. The input space is partitioned into intervals of length Δ, and each interval maps to one of the $2^B$ output levels. Multiple intervals map to the same level.

Figure 2D:
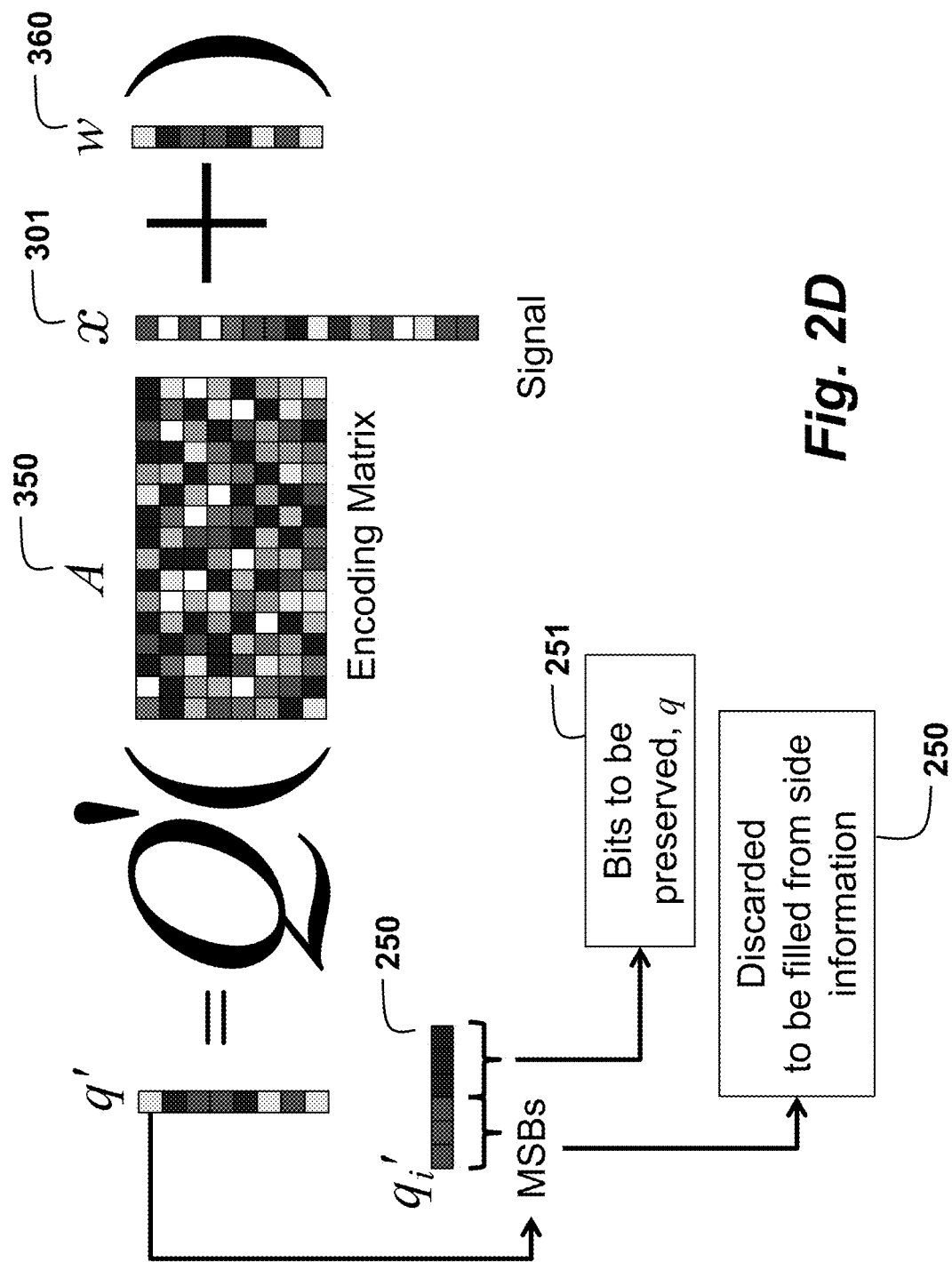
FIG. 2D is a schematic of an alternative interpretation of the operation of the universal encoder according to embodiments of the invention.

As shown in FIG. 2D, the non-monotonic quantizer Q(•) can also be viewed as a uniform scalar quantizer Q'(•) with quantization interval Δ followed by an operation that maps different quantization levels to one. The uniform scalar quantizer Q'(•) produces a multibit representation q' 240 where one or more of the most significant bits (MSBs) are discarded 250. Thus, all quantization levels with the same least significant bits (LSBs) preserved 251 have the same output. The output of the encoder is q 321, used by the decoder 320 to estimate the input signal x 301.

Decoding

The decoder 320 has access to side information y 319 that enable the estimatation $\hat{x}$, with some distortion of the signal x. The predictor for the estimate of $\hat{x}$ is a function $f(•)$ and the prediction is determined by applying this function $$\hat{x}=f(y). \quad (1)$$

A number of methods can be employed to predict the signal, and a number of ways can be employed to obtain side information at the decoder, some of which are described below.

The decoder measures the predicted signal and adds dither w, in the same manner as the encoder.

$$\hat{y}=A\hat{x}+w, \quad (2)$$

If quantized with a uniform scalar quantizer Q'(•), with quantization interval Δ, then the predicted quantized values would be $\hat{q}=Q'(A\hat{x}+w)$. However, the predicted measurements $\hat{y}$ contain more information that, when combined with the encoding q, can produce decoded quantized measurements $\tilde{q}$, based on which, the signal can be decompressed. To extract this information, the decoder selects a level from the set of possible output levels used by a uniform quantizer Q'(•). Specifically, each coefficient $\tilde{q}_i$ is selected from all the levels that are consistent with the corresponding encoding $q_i$. From all these levels, the closest level to the predicted coefficient $\hat{y}_i$ is selected.

This selection is demonstrated by examples shown in FIGS. 3A-3B. Given an encoding level $q_i=1$, there are multiple possible consistent regions, two of which are shown in FIG. 3A. The corresponding uniform quantizer, shown in FIG. 3B, has two different quantization levels consistent with the encoding $q_i=1$, which correspond to $\hat{q}_i=-2.5$ and $\hat{q}_i=1.5$, denoted by a circle in the figure Because the prediction from the side information $\hat{y}_i$ is closest to the level −2.5, this is selected as the decoded quantized measurement $\tilde{q}_i$, while the level 1.5 is discarded, as denoted by the circle with the cross in the figure. Note that the levels of the non-monotonic and the uniform quantizers do not necessarily coincide.

Ideally, the decoded measurements $\tilde{q}$ should be equal with corresponding measurements of the compressed signal using the scalar quantizer, i.e., the measurements should be equal to Q'(Ax+w). However, in practice there can be some decoding errors. In some embodiments, these errors can be ignored because the subsequent reconstruction can compensate for the errors as described in the following.

In some embodiments, the encoder can use other information that enable correction of these errors at the decoder. For example, if the encoder has access or can determine the predicted measurements, then the encoder can determine the coefficients where errors occur. The encoder can then transmit a separate bitstream indicating the location of these errors, so that the decoder can discard those coefficients. Alternatively the encoder can transmit a correction to these errors so that the coefficients are not discarded.

Given the decoded measurements $\tilde{q}$, the decoder reconstructs an estimate of the signal $\tilde{x}$ using the side information, the prediction and any prior information about x, such as a general model.

Reconstruction

The goal of the decoder is to estimate the signal $\tilde{x}$ that is consistent with the decoded measurements and adheres to prior knowledge about models of x. For example, a conventional model has sparsity in some basis, or low total-variation norm.

In the case of the sparsity model, the reconstruction for the estimate takes the form of an optimization, such as $$\tilde{a} = \underset{a}{\arg\min} \ \|a\|_p \quad \text{s.t.} \quad \tilde{q} = Q'(ABa + w), \text{ and} \quad (3)$$

$$\tilde{x} = B\tilde{a}, \quad (4)$$

where $0 \leq p \leq 1$ and $\|\cdot\|_p$ denotes an $\ell_p$ norm, B denotes a basis or a dictionary in which the signal is assumed to be sparse, and $\tilde{a}$ denotes the sparse coefficients comprising the signal in the basis B.

Similarly, for a low total variation model the reconstruction takes the form $$\tilde{x} = \underset{x}{\arg\min} \ \|x\|_{TV} \quad \text{s.t.} \quad \tilde{q} = Q'(Ax + w), \quad (5)$$

where $\|\cdot\|_{TV}$ denotes the appropriate total variation norm for the signal model.

Often, the optimization can use the side information to produce weights for the norms:

$$\tilde{a} = \underset{a}{\arg\min} \ \|a\|_{p,v} \quad \text{s.t.} \quad \tilde{q} = Q'(ABa + w), . \quad (6)$$

$$\tilde{x} = B\tilde{a}, \quad (7)$$

and $$\tilde{x} = \underset{x}{\arg\min} \ \|x\|_{TV,v} \quad \text{s.t.} \quad \tilde{q} = Q'(Ax + w), \quad (8)$$

where $\|\cdot\|_{p,v}$ and $\|\cdot\|_{TV,v}$ are the weighted $\ell_p$ and total variation norms, respectively, as known in the art. The weights v can be derived from the side information or the prediction of x. For example, if the prediction is sparse in the basis B, then the weight can be set such that the sparsity pattern of the reconstructed signal is similar to the sparsity of the basis using methods well known in the art.

If the side information is a similar signal it can also be used as an additional soft or hard constraint in the optimizations above, e.g., by requiring that the recovered signal $\tilde{x}$ is similar to the prediction $\hat{x}$. This can be enforced, for example, using an additional penalty factor such as $\lambda \|\hat{x} - \tilde{x}\|_2^2$ in the cost function of the optimization (soft constraint) or a constraint such as $\|\hat{x} - \tilde{x}\|_2^2 \leq \epsilon$ (hard constraint), using method well known in the art.

In the optimizations above, the constraint $\tilde{q} = Q'(Ax+w)$ is convex and can be expressed as $\|\tilde{q} - Q'(Ax+w)\|_\infty \leq \Delta/2$, or, equivalently, as $\Delta/2 \leq \tilde{q}_i - (Q'(Ax+w))_i \leq \Delta/2$. Alternatively, they can also be relaxed and imposed as a soft constraint, e.g., by penalizing $\lambda \|\tilde{q} - Q'(Ax+w)\|_\infty$, or $\lambda \|\tilde{q} - Q'(Ax+w)\|_p$ for $p > 1$.

Other optimizations that can be used include a greedy algorithm, or a convex optimization.

In some embodiments, the reconstructed signal $\tilde{x}$ can be considered a new, improved, prediction of x, leading to new, improved, prediction of the measurements, and, therefore, new and improved decoded measurements, e.g., with fewer errors. This, in turn produces a new reconstruction $\tilde{x}$, with lower distortion. The process can be repeated until a termination condition is reached, e.g., there is no improvement or the improvement is less than a predetermined threshold.

Furthermore, after a reconstructed signal $\tilde{x}$ is available, it can be used in conjunction with the side information and the prediction to further improve the prediction. For example, a dictionary can be learned from the reconstructed signal $\tilde{x}$ and the predicted signal $\hat{x}$, and used to generate a new prediction of the signal given the side information using methods well known in the art. This, again, provides an improved prediction which can be used, as above, to improve the reconstruction. This process can also be repeated until there is no improvement or the improvement is less than the predetermined threshold.

Generation of Side Information

The side information used at the decoder can come from a number of sources, even from the encoder itself in a separate bitstream. For example, the side information can be a compressed version of the same signal with a higher distortion and a lower rate, or a different signal, which is very similar to the signal to be compressed. The side information can also include quantities that improve the prediction of the compressed signal from the signal in the side information, such as the average value of both signals, their variance, and their cross-correlation. This information can also be determined at the encoder and stored or transmitted together with the universal encoding of the signal.

Compression Method and System

Figure 4:
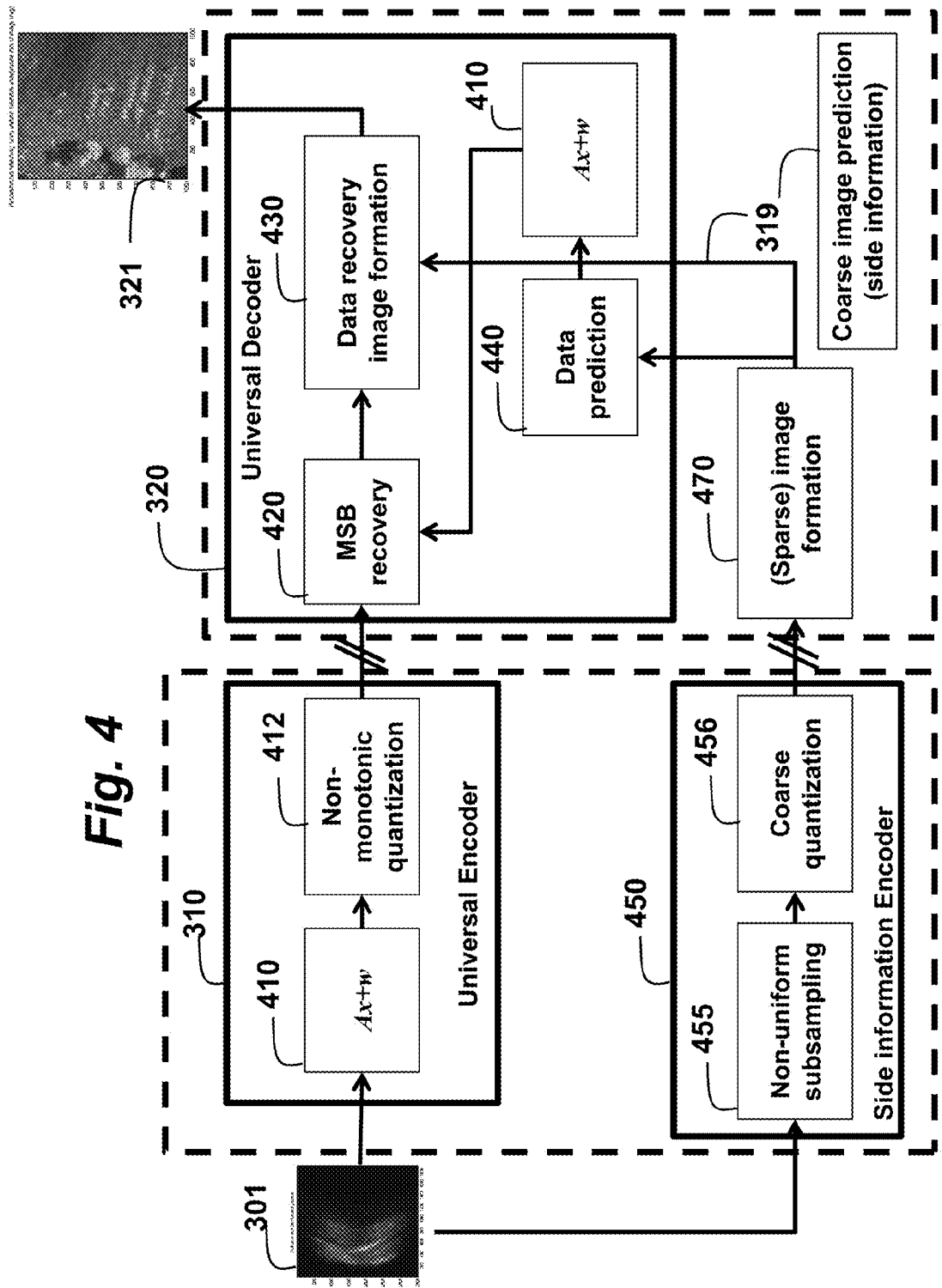
FIG. 4 is a flow diagram of a compressing synthetic aperture radar (SAR) data using embodiments of this invention.

FIG. 4 shows the details of the system according to one embodiment of the invention. The encoder 310 obtains the linear measurements Ax of the input signal 301 and adds dither w as Ax+w 410. Non-monotonic quantization 412 is applied to the universal measurements, which can be transmitted to the decoder 320. This embodiment in FIG. 4 can, for example, be used to compress synthetic aperture radar (SAR) signals, or other radar or light and radr (LIDAR) data. Such data are often used to recover images through a transformation, known as image formation, or image reconstruction.

In this particular embodiment, the encoder can also separately encode information necessary to produce the side information 450. To do so, the encoder can perform non-uniform subsampling 455 and coarse quantization 456. The side information y 319 can also transmitted to the decoder for image formation 470, which produces a coarse image prediction that serves as the side information 319. The decoder can apply data prediction 440 to the side information to predict the measurements Ax+w 410.

From the measurements, the decoder recovers the most significant bits (MSB) of the quantization 420, which recovers the data required to perform image formation 430. Image formation uses can also use the predicted data 440.

Figure 5:
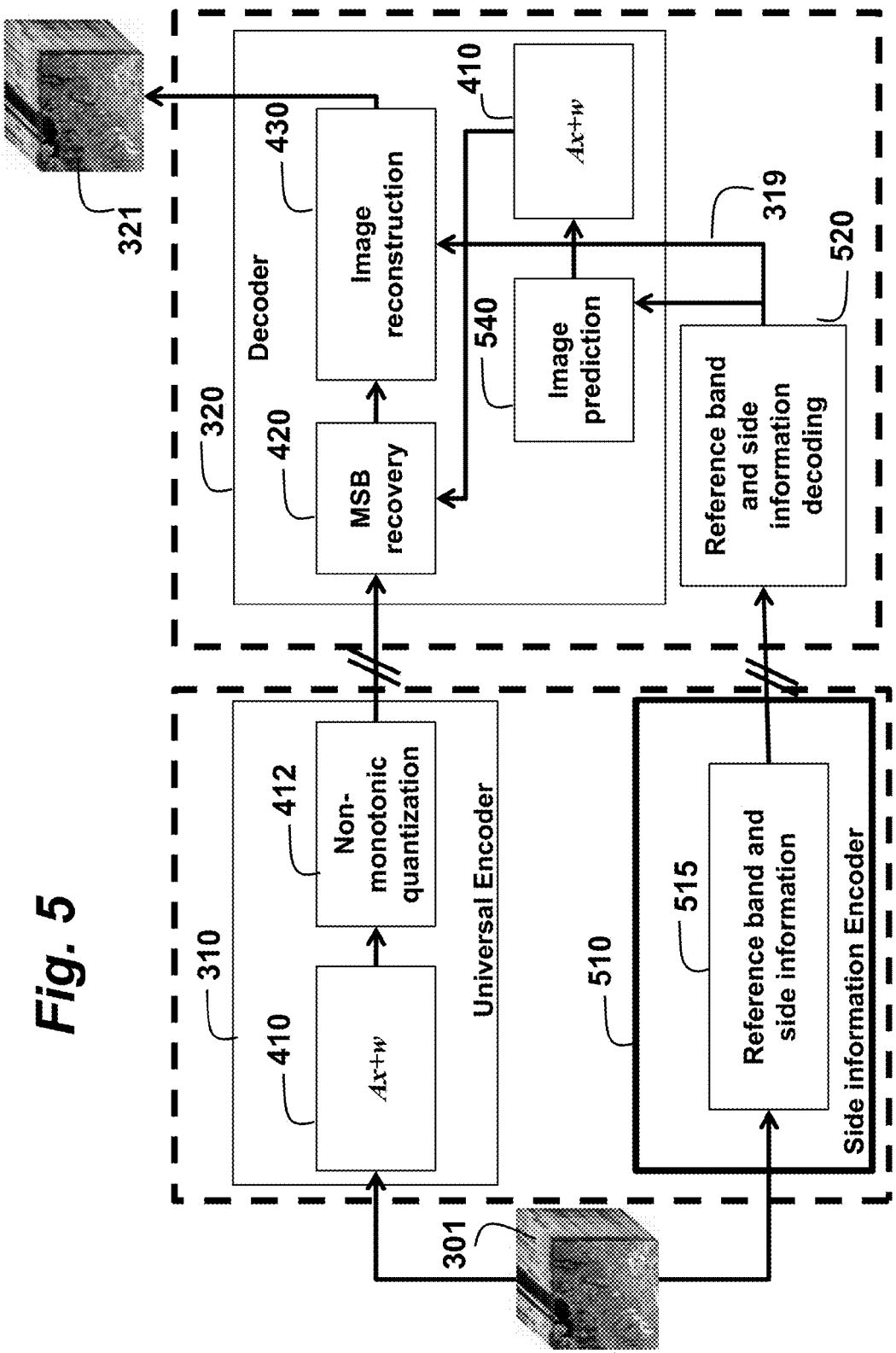
FIG. 5 is a flow diagram of compressing a multispectral or hyperspectral image using embodiments of this invention.

FIG. 5 shows the details of the system according to another embodiment of the invention. This embodiment can be used to compress signals that are similar to a reference signal, such as multispectral and hyperspectral images. This embodiment is described assuming the signal is a multiband image, such as a multispectral or a hyperspectral image, but other examples could be video sequences or images of the same scene obtained by different cameras, among others.

Here, the encoder produces reference band and side information 520, further described below, which are used by image prediction 540.

Applications and Protocols

Synthetic aperture radar (SAR) are radar systems, often mounted on satellites or airplanes, and typically used to image large areas with very high resolution. SAR systems, operate by emitting pulses and receiving and recording their reflections. These recordings are the raw SAR data that are subsequently processed to produce a SAR image. This processing, known as image formation, is performed at a ground station, typically by a powerful computer, because it requires significant computational power and memory, that is not available at the satellite or the airplane.

SAR raw data are particularly difficult to compress because, at first glance, they seem to lack structure. However, SAR images do have structure (because they are images), which, in principle can be exploited for compression. A conventional compression method or a compression with side information method requires that the image formation is performed at the encoding stage, which can be beyond the computational capabilities of the encoder at the a satellite.

However, an embodiment of the invention can be used to compress the data without performing image formation. This is performed at the decoder, typically a powerful ground station, during the prediction and reconstruction step. Note that the subsequent description uses the word "transmitting" to signify the use of the bitstream after the encoding. This is because, in a typical modern application, such data are immediately transmitted to a server at a ground station for decoding and processing. The data can also be stored in memory or in a permanent storage, e.g., disk or tape, for subsequent retrieval and processing.

The encoder uses the protocol described above to encode and transmit the data. Note that the data received by the SAR system are already measurements of the image, so the encoding matrix implemented on the encoder can be an identity, matrix or a subsampling matrix that selects a subset of the data. The effective encoding matrix A, however, is the composition of the implemented matrix with the matrix describing the linear system from the SAR image to the SAR data.

In many SAR systems, the decoder may not have side information from another source. Thus, the SAR system also generates and transmits the side information. In one embodiment, the SAR data are subsampled or measured with a linear system and then quantized using a conventional uniform quantizer which is coarse, i.e., uses very few bits. These quantized measurements are transmitted as the side information.

The decoder reconstructs a coarse image from the side information, using sparse reconstruction, or reconstruction with low total variation, or reconstruction using a dictionary learned from prior SAR data, and optimization-based reconstruction methods. This coarse image serves as a prediction for the universally encoded signal. Thus, the image is used to generate a prediction of the data and to follow the decoding protocols described above.

SAR data can include data of different polarization or data collected by different satellites. The invention can be similarly used to compress this data. In some embodiments, one polarization or the data from one satellite, or linear measurement of them, can serve as the side information for the decoding of another polarization or the data from another satellite.

Multispectral and Hyperspectral Data

Similar issues appear in multispectral or hyperspectral data. This data includes multiple images obtained from the same target, e.g., a scene, a ground swath, or an object, each image only recording the reflectivity of the target at a specific range of spectral bands—relatively wide range for multispectral, relatively narrow range for hyperspectral. Such systems are often portable and mounted on satellites, airplanes, autonomous aerial vehicles, or ground vehicles, which typically do not have access to significant computational resources.

A key difference of multispectral and hyperspectral data with SAR and other radar data is that multispectral and hyperspectral images are typically acquired directly and an image formation step is not necessary to produce the image. In other words, the data to be compressed is the image itself.

Still, conventional compression methods require a prediction and a transformation step to be performed at the encoder. When such systems are used in computation-constrained applications, prediction and transformation of the images can be prohibitively complex. Note that the subsequent discussion uses the word "transmitting" to signify the use of the bitstream after the encoding. This is because, in typical modern application, such data are immediately transmitted to a server for decoding an processing. However the data might be stored in memory or in a permanent storage—hard drive or tape for later retrieval and processing.

Again, embodiments of the invention can be used to efficiently compress such images. The universal encoder protocol operates as described above. For efficiency, the measurement matrix A can operate either on the entire set of images, on small subsets of the images, on each spectral band separately, or on blocks of each image, or combinations thereof.

The side information is also transmitted by the encoder system. In some embodiments, the side information comprises a single reference band, which can be a single image or a panchromatic image comprising the sum of all images on the satellite, or some other combination of the images. This reference band is encoded using embodiments of this invention or a separate encoding system, such as Joint. Photographic Experts Group (JPEG) (ISO/IEC 10918) or JPEG2000. Multispectral and hyperspectral images are very similar between bands, so the reference band can be used as the prediction of the encoded data.

However, often, the prediction can be improved using a linear prediction scheme. If y is a reference, and x is to be predicted, then the linear minimum mean squared error (MMSE) predictor of x is $$\hat{x} = \frac{\sigma_{xy}}{\sigma_y^2}(y - \mu_y) + \mu_x, \tag{9}$$

where $\mu_x$, and $\mu_y$ are the means of x and y, respectively, $\sigma_x^2$, and $\sigma_y^2$ their variance, and $\sigma_{xy}$ their covariance. It is straightforward and well known in the art how to extend this prediction to the prediction using multiple references.

Because the encoder has access to the reference band, it is straightforward to determine and transmit the relevant means as side information, variances and covariances for all the spectral bands, such that the prediction can be improved at the receiver. If this is transmitted as side information, then the receiver uses the side information to improve the prediction of each spectral band from the reference band. In some embodiments, to further improve the performance, these quantities might be determined, transmitted, and used on parts of the image, e.g., on blocks, such that local statistics of the image are better exploited by the prediction.

Furthermore, as described above, the encoder in this case has the ability to determine a simple prediction of the signal using the side information and, thus, be able to detect when decoding errors will happen. Thus, it can transmit as separate side information the position and can be the magnitude of these errors, so that they can be corrected at the decoder.

Of course, the more side information is determined and transmitted, the higher the rate consumed by the side information. Increasing the rate used for the side information can improve the prediction, thus decreasing the rate required of the universal encoding. However, there are diminishing returns, i.e., the gains decrease. Thus, the amount and the rate required for side information should be balanced with the rate required for the universal encoding.

The decoder uses the side information to predict one or more spectral bands, and then use the encoding to reconstruct the image. If a subset of spectral bands has already been decoded, the subset can be used to improve the prediction of subsequently decoded spectral bands, this improving the decoding performance. As described above, reconstructions can be used as new predictions and to generate new side information so that the process can be repeated, further improving the decoding performance. Dictionary learning techniques can also be used as described above.

Multispectral Image Compression Using Universal Vector Quantization

Some embodiments are based on recognition that the scalar quantization can be generalized to vector quantization, which can further improve compression efficiency of the scalar quantization. To that end, in some embodiments, the encoding reuses quantization labels to label multiple quantization cells and leverages the side information to select the correct cell at the decoder. The image can be reconstructed using weighted total variation minimization, incorporating side information in the weights while enforcing consistency with the recovered quantization cell.

Indeed, one embodiment exploits correlations between spectral bands to reduce the bitrate, while maintaining low complexity at the encoder. The correlations are exploited at the decoder, which is designed to use information from previously decoded spectral bands as side information to augment and decode the bitstream. Decoding and recovering the image requires solving a sparse optimization problem, which can be looked at as a quantized compressed sensing (CS) problem.

Some embodiments are based on recognition that while CS can be used to design light-weight encoders, it is not a rate-efficient because the most significant bits (MSBs) encode redundant information. Universal quantization removes redundancies by eliminating the MSBs. However, this makes the reconstruction problem non-convex possibly with combinatorial complexity. Generalizing to vector quantization further exacerbates the problem.

As a remedy, some embodiments use side information to make the reconstruction convex and tractable, without compromising rate-efficiency. In particular, similarly to the principles of distributed coding, in one embodiment, the encoder only transmits information on how to refine the prediction from the side information, i.e., the relative location of compressive measurements of the signal with respect to their prediction. The decoder, thus, uses the prediction to generate a convex quantization cell in which the measurements belong, and uses a sparse recovery algorithm to decode the signal with measurements in that cell. In addition, the decoder uses the side information to bias the compressive recovery algorithm to a solution closer to the encoded signal.

Figure 6:
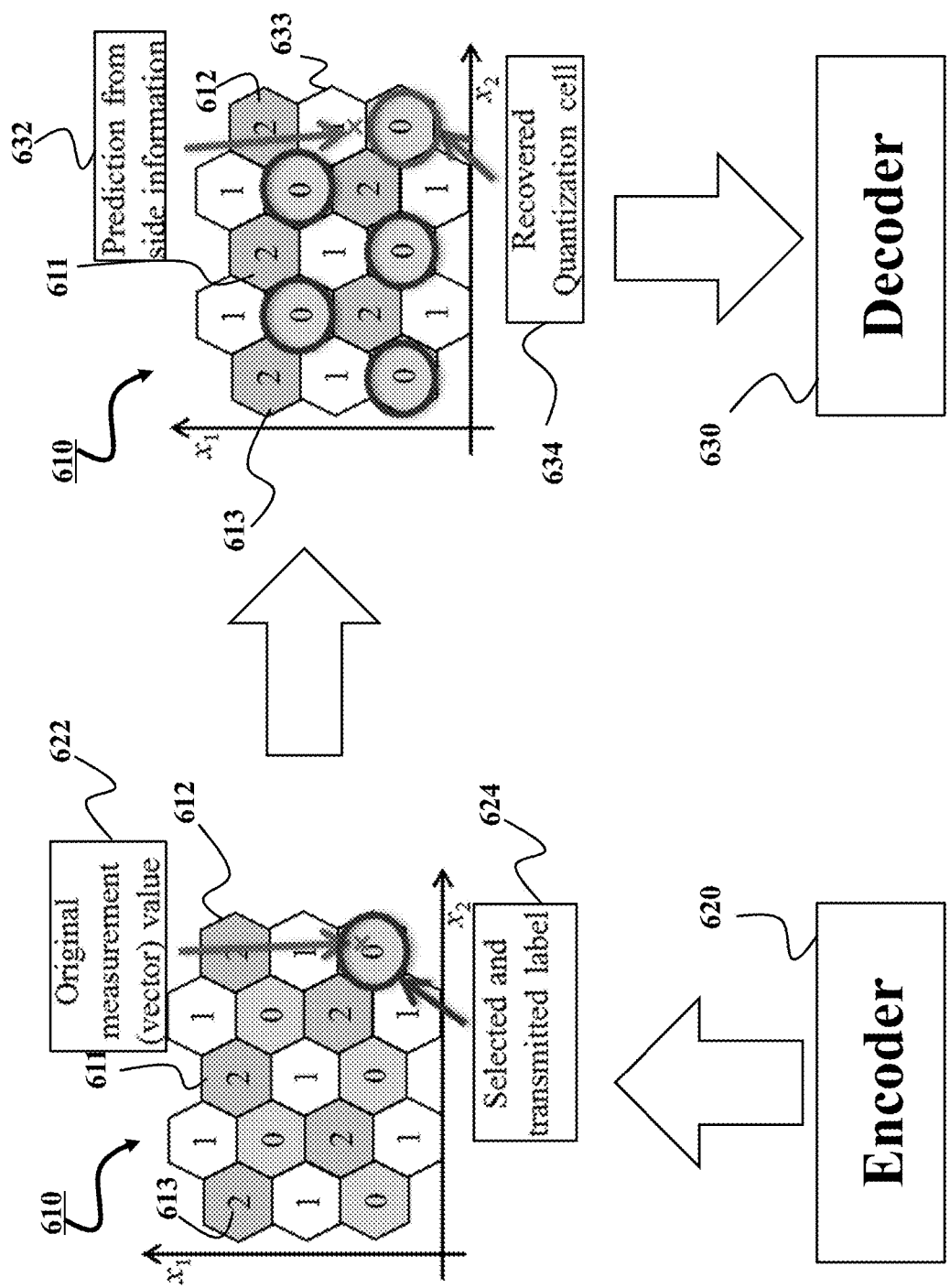
FIG. 6 is a schematic of a map of a space of encoded values used by an encoder and a decoder according to some embodiments.

FIG. 6 shows a schematic of a map 610 of a space of encoded values used by an encoder 620 and a decoder 630 according to some embodiments. The map 610 includes a plurality of cells, e.g., 611, 612, and 613, partitioning the space of the encoded values. In this example the space is multi-dimensional, i.e., two-dimensional over values of $x_1$ and $x_2$. The dimensions of space can vary for different embodiments. The space is partitioned such that each cell encloses a cluster of encoded values and quantizes the cluster of encoded values to a quantized encoded value. For example, the cell 613 surrounds, i.e., quantized a subset of continuous values. Each cell is identified by a label selected from a finite alphabet, such that multiple cells in the map are identified by the same label, and wherein the cells are labeled such that a pair of cells identified by the same label does not share a common boarder.

For example, in FIG. 6, the cells are labeled with integer numbers 1, 2, 3 . . . N, wherein N is a finite number. However, different embodiments can use different values. For example, one embodiment labels the cells using letters of alphabet "a, b, c, etc." The value of the number N is typically low, and can depend on the dimensionality D of the space of the encoded values. For example, the N can be equal D+1, but other values are possible. Low value of N helps to improve the compression rate. Because of the low value of N, different cells can have the same label. For example, cells 611 and 613 have the same label "2." To disambiguate the cells with identical labels, one embodiment labels the cells such that a pair of cells identified by the same label does not share a common boarder.

In different embodiments, cell can have different shape. For example, in two-dimensional example of FIG. 6, cells have a hexagonal shape that is more efficient in partitioning the two-dimensional space. In alternative embodiment, the cells have rectangular shape that is more easily used for the partitioning.

The encoder encodes the value 622 and locates the cell on the map 610 that encloses the encoded value. In this example, the encoder selects the cell 624 having a label "0," and transmits the label "0" to the decoder 630. The decoder 630 predicts the encoded value 632 using the side information. Such a predicted value is different from the encoded value. The label of the cell 633 on the map 610 that encloses the predicted value 632 is "1," which is different from the transmitted value of the label "0." To that end, the decoder selects the closest cell to the predicted value 632 that has the transmitted label "0," which in this example is the cell 634. The cell 634 encloses a subset of continuous value, i.e., quantizes the subset of continuous value to a quantized value. Such a quantized value of the cell 634 is the decoded value determined by the decoder 630.

Figure 7:
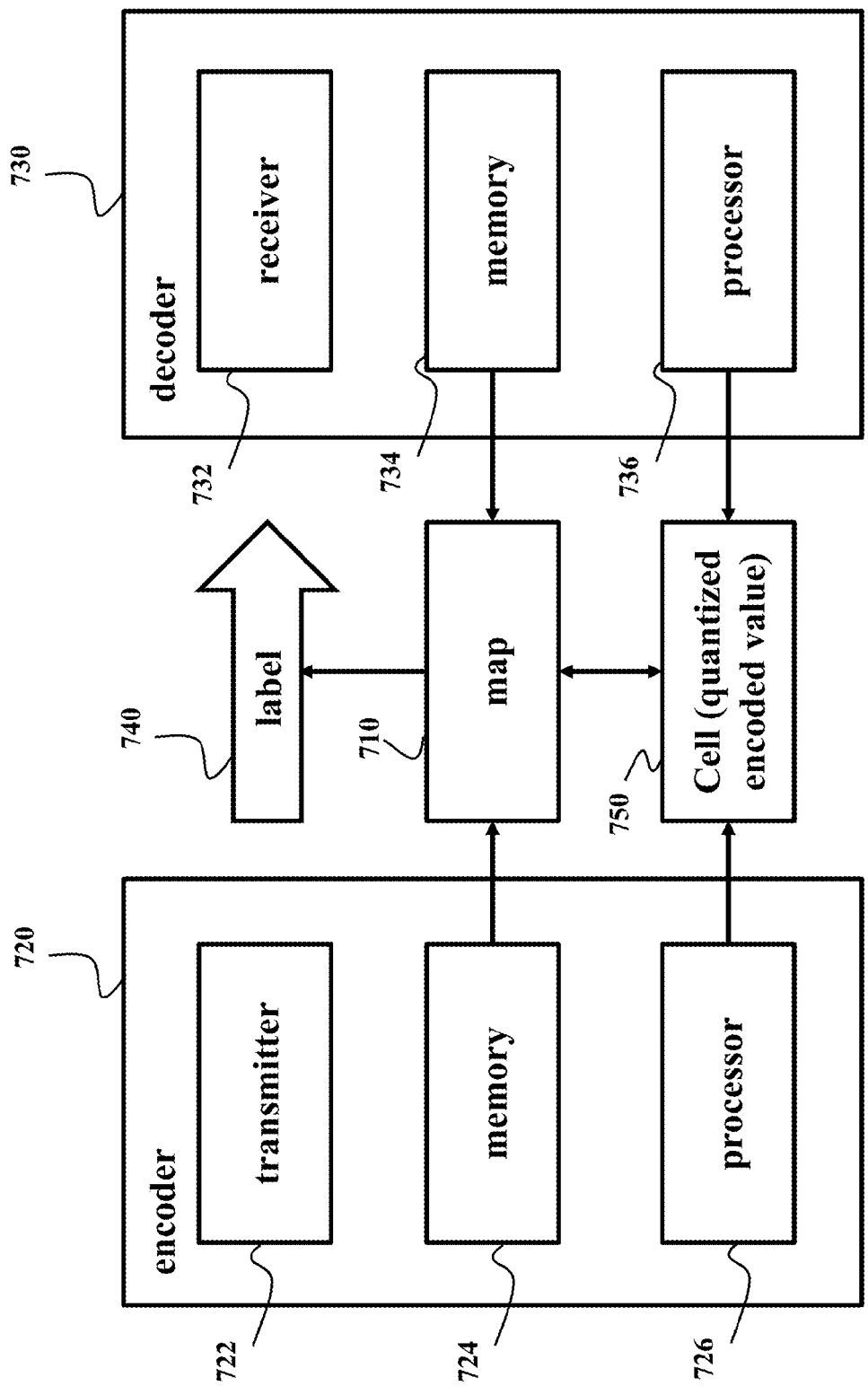
FIG. 7 is a block diagram of an encoder in communication with a decoder to perform encoding and/or decoding according to principles of some embodiments.

FIG. 7 shows block diagrams of an encoder in communication with a decoder to perform encoding and/or decoding according to principles of some embodiments. The encoder 720 includes a processor to determine an encoded value and a memory 724 storing a map 710 of a multi-dimensional space of encoded values. The map 610 includes a plurality of cells partitioning the multi-dimensional space, such that each cell encloses a cluster of encoded values and quantizes the cluster of encoded values to a quantized encoded value, wherein each cell is identified by a label selected from a finite alphabet, such that multiple cells in the map are identified by the same label, and wherein the cells are labeled such that a pair of cells identified by the same label does not share a common boarder. The encoder determines the cell 750 enclosing the encoded value on the map of the multi-dimensional space and transmits, using a transmitter 722, to a decoder 730 a label 740 of the cell 750.

Similarly, the decoder 730 includes a receiver 732 to receive from the encoder 720 the label 740 and a memory 734 storing the map 710. The decoder also includes a processor 736 to estimate the encoded value using side information to produce an estimation of the encoded value, to select a cell identified by the received label on the map of the multi-dimensional space that is the closest to the estimation of encoded value, and to determine the encoded value as the quantized encoded value of the selected cell.

As used herein, the term processor will be understood to encompass can be a single core microprocessor, a multi-core microprocessor, a computing cluster, a field programmable gate array (FPGA), application specific integrated circuit (ASIC), or any number of other configurations including combinations thereof. The memory can include random access memory (RAM), read only memory (ROM), flash memory, or any other suitable memory (including storage) systems and can be non-transitory computer-readable storage medium. As used herein, the term "non-transitory computer-readable storage medium" will be understood to encompass volatile memory (e.g., DRAM and SRAM) and non-volatile memory (e.g., flash, magnetic, and optical memories) but to exclude transitory signals.

Figure 8A:
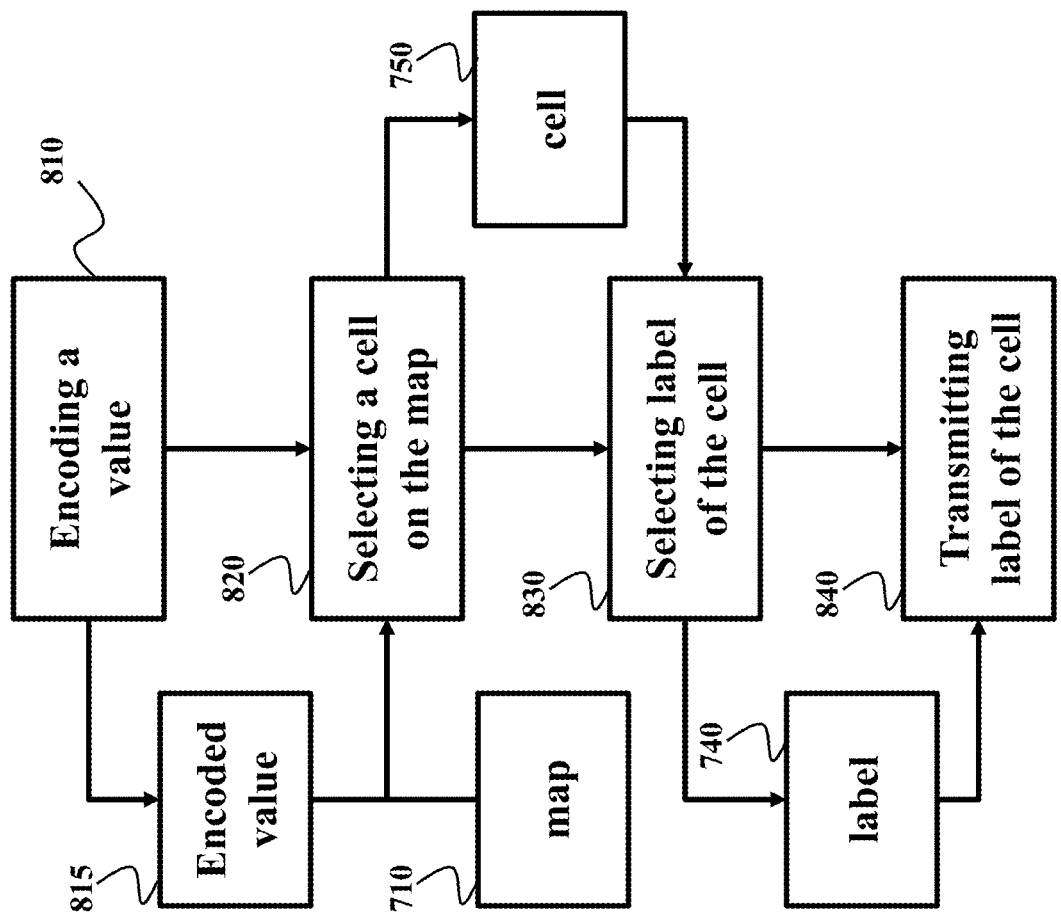
FIG. 8A is a block diagram of a method for encoding a value according to some embodiments.

FIG. 8A shows a block diagram of a method for encoding a value according to some embodiments. The steps of the method are performed by a processor of an encoder. The encoder encodes 810 a value to produce an encoded value 815 and selects 820 a cell 750 on the map 710 that encloses the encoded value 815. The encoder selects 830 a label 740 of the cell and transmits 840 the selected label.

Figure 8B:
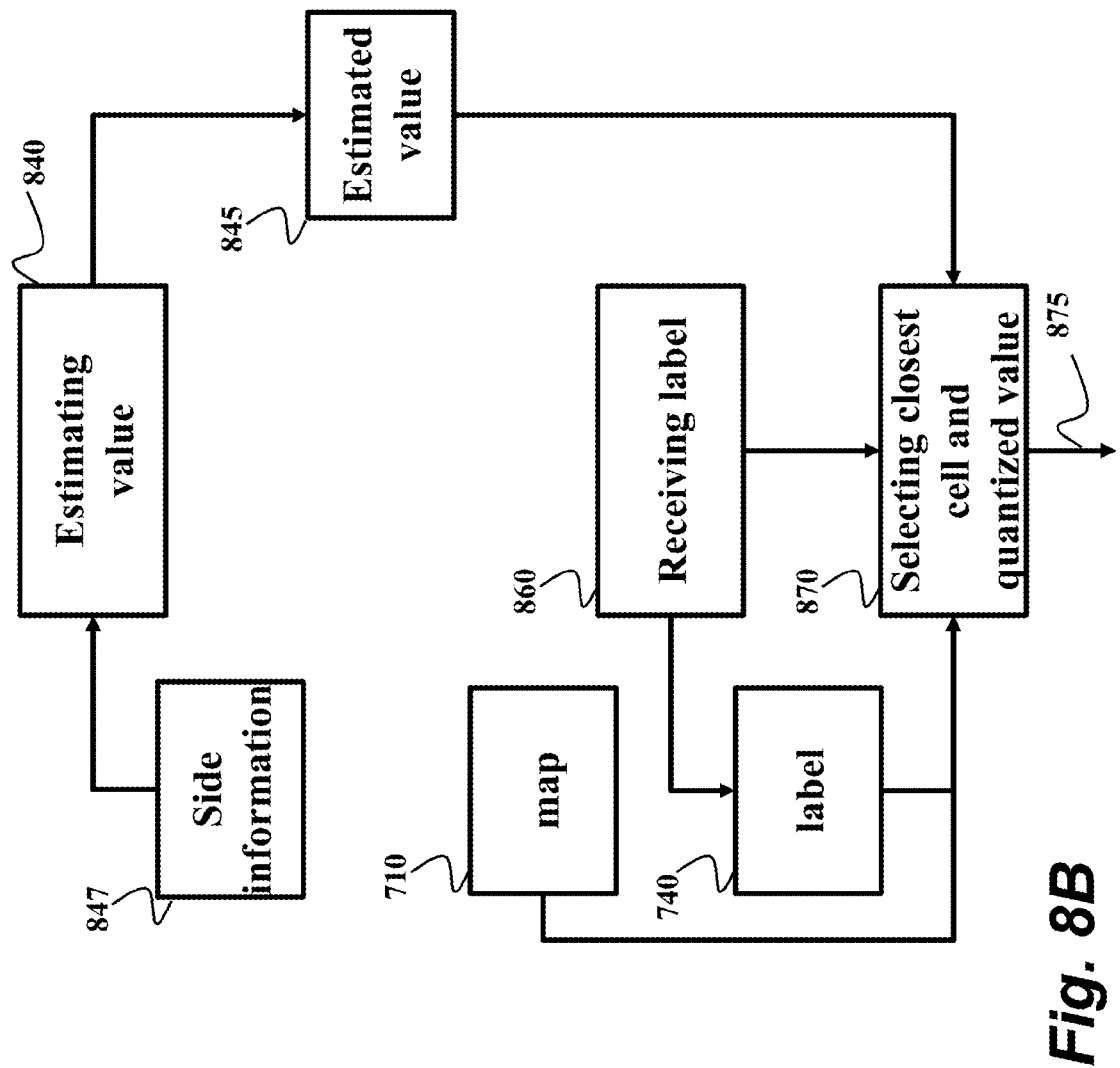
FIG. 8B is a block diagram of a method for decoding an encoded value according to some embodiments.

FIG. 8B shows a block diagram of a method for decoding an encoded value according to some embodiments. The steps of the method are performed by a processor of a decoder. The decoder estimates 840 the transmitted encoded value to produce an estimated value 845. The estimation is performed using side information 847, such as statistical similarity measures of the signal to be reconstructed by the decoder. The decoder receives 860 the transmitted label 740 and selects 870 on the map 710 the cell 875 that is closest to the estimated value 845 among cells having label 740. The decoder selects the quantized value of the cell 875 as the decoded value.

For example, some embodiments use the $D_3$ lattice and the quantization label of a vector y is computed using $$y_q = D_3\left(\frac{y}{\Delta} + w\right) \bmod 2^B, \tag{10}$$

where the $D_3$ (•) is the $D_3$ lattice quantizer, operating on triplets in its argument, $\Delta$ is a scaling factor, w is an optional dither drawn uniformly over a canonical quantization cell, and mod is taken along each of the 3 coordinates separately. The Voronoi regions of the $D_3$ lattice quantizer are dodecahedra, forming a space-filling packing in 3D. The mod function ensures that quantizer labels are reused and that centers with the same label have offsets equal to integer multiples of $\Delta 2^B$ along each coordinate.

In various embodiments, the decoder has access to the side information and can resolve the ambiguities resulting from label reuse and solve a quantized compressed sensing (CS) problem. The CS problem considers a sparse signal $x \in \mathbb{R}^n$. The signal is measured using random projections y=Ax, $y \in \mathbb{R}^m$ acquired by a sensing matrix $A \in \mathbb{R}^{m \times n}$. For natural images, sparsity in the gradient, i.e., low total variation (TV), is usually the preferred signal model. Recovery enforces the model through TV minimization $$\hat{X} = \arg\min_X TV(X) + \lambda \ \|y - Ax\|_2^2, \tag{11}$$

where X is a two-dimensional image, x is a vectorized version of the image X and the isotropic TV is defined as $$TV(X) = \Sigma_{i,j}\sqrt{|X_{i+1,j}-X_{i,j}|^2+|X_{i,j+1}-X_{i,j}|^2}. \tag{12}$$

Using appropriate sensing matrices only m=O(k log n)<<n can be used for signal reconstruction—where k measures the model sparsity—compared to the n required if the signal is not known to be sparse. Thus, CS acquisition preforms an implicit compression of the signal during acquisition. A number of matrix constructions can be used, including fully randomized ones as well as more structured ones exploiting fast transforms. Fast transforms are appealing for lightweight compression, because they significantly reduce memory and computational requirements.

While CS is a very effective acquisition approach, it does not perform well as a compression method, if implemented in a straightforward manner. In particular CS-based compression methods suffer from poor rate-distortion performance compared to transform coding, despite the significant undersampling factor. The reason is that, fundamentally, the CS-based measurements oversample the signal once the sparsity pattern sparsity is taken into account. To that end, some embodiments combine the CS with vector quantization to increase the compression rate of the transmission.

Figure 9:
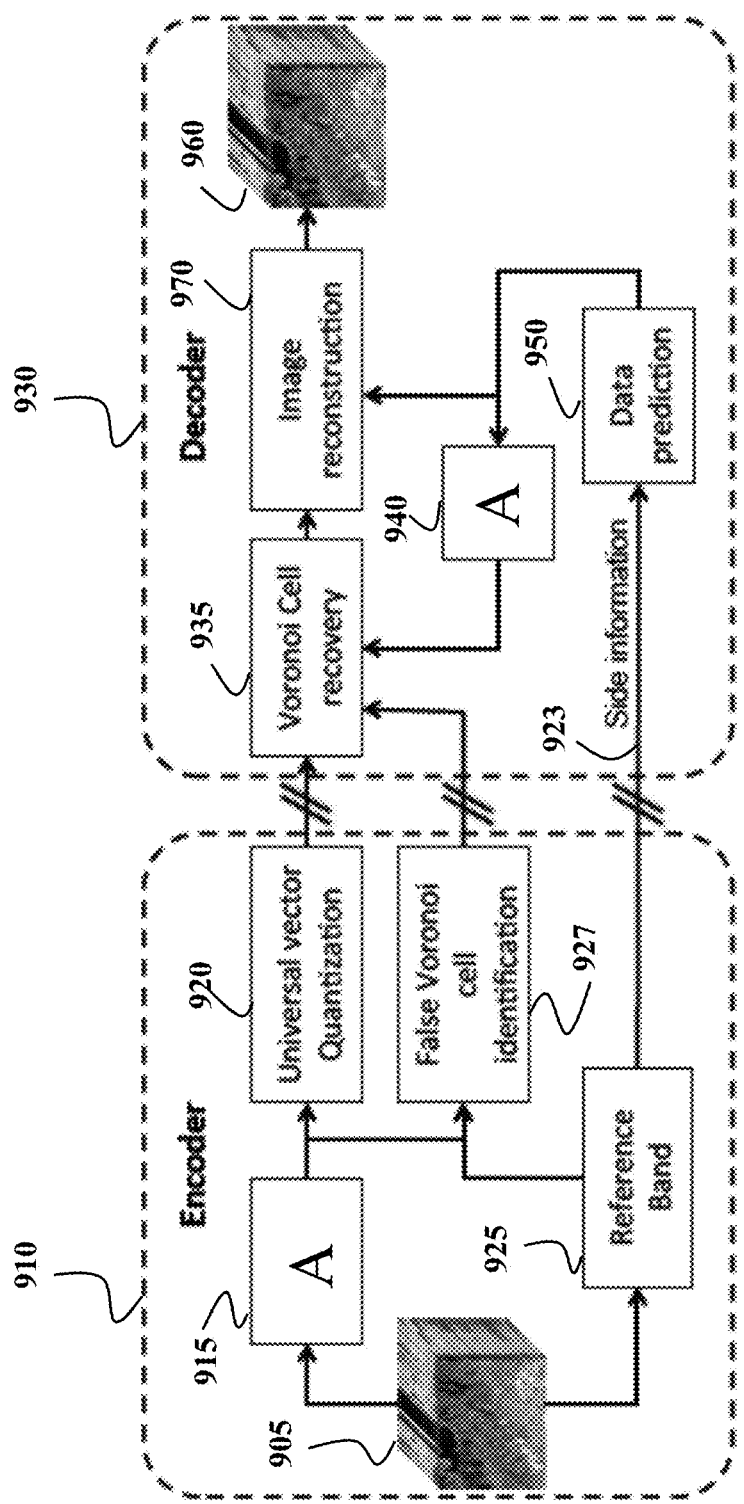
FIG. 9 is a block diagram of encoding and decoding methods for performing data compression according to one embodiment

FIG. 9 shows a block diagram of an encoding and decoding architecture performing a compression according to one embodiment. In this embodiment, the encoding reuses quantization labels to label multiple quantization cells and leverages the side information to select the correct cell at the decoder. The image is reconstructed using weighted total variation minimization, incorporating side information in the weights while enforcing consistency with the recovered quantization cell.

Encoding

In some embodiments the encoder 910 transmits one of the bands 925 of the image 905 as side information 923. The side information 923 can be encoded or compressed using various techniques. Also, this side information maybe combined with additional statistics transmitted by the encoder to predict the other bands of the image.

The remaining bands are partitioned into non-overlapping blocks of size $n_x \times n_y$. A small number of random projections $y \in \mathbb{R}^m$ is computed for each block $x \in \mathbb{R}^n$, $n=n_x \times n_y$ using, for example, a partial Hadamard matrix A 915, i.e., obtained by randomly sub sampling the rows of the Hadamard transform and dither w. The measurements are quantized 920 in sets of 3 using the $D_3$ lattice with a scaling of $\Delta$, according to equation (10). When the universal vector quantizer uses the $D_3$ lattice, each block of three measurements can be mapped to one of $2^{3B-1}$ points. Therefore, $$B - \frac{1}{3}$$

bits per measurement are required. Taking into account the sub sampling factor, the actual rate is $$\frac{m}{n}\left(B - \frac{1}{3}\right)$$

bits per pixel (bpp).

The side information 923 is used at the decoder to predict the original quantization cell, thus resolving the ambiguity arising from the mod operation, and making consistent reconstruction a convex problem. However, the prediction might make errors depending on its quality. A group is affected by a first order error when the error vector has norm equal to $\Delta 2^B$, i.e., only one of the entries of the error vector contains either $\pm\Delta 2^B$. The decoder itself can be made robust to some sparse errors, but a low quality prediction can cause more errors than the decoder can correct.

Fortunately, the encoder also has access to the other bands and can compute, encode, and transmit additional side information indicating where such errors occur 927. Thus, the trade-off in designing $\Delta$ and B to introduce more or fewer errors now manifests as additional rate required to encode the side information with the location of the errors. Since larger $\Delta$ and higher B result in fewer prediction errors, they require lower rate for error encoding, at the expense of larger reconstruction error and higher universal quantization rate, respectively. Correspondingly, smaller $\Delta$ and B reduce the reconstruction distortion and universal quantization rate, respectively, but increase the rate to encode side information on errors.

A compromise used by some embodiments is achieved by explicitly encode first order errors because their correction in the reconstruction program is not very effective due to their small norm. For example, this is done in the following way. Each group has a label ranging from 0 to $$\frac{m}{3} - 1.$$

The labels of groups exhibiting first order errors are sorted by increasing order and differentially encoded using a universal Exp-Golomb code. There can only be 6 types of errors, so a code requiring at least $\log_2(6)$ bits per group is enough to distinguish the correct error. Concerning higher order errors, the group labels are the only information that is coded, again with a differential Exp-Golomb code.

Decoding

The decoder 930 has available the universally quantized CS measurements $y_q$ and a real-valued prediction 950 of them p obtained from the side information 923. For example, the prediction 950 can be obtained by first predicting the signal $x_{pred}$ and then measuring it 940 using the measurement matrix: $p=Ax_{pred}+w$.

Similarly, to the scalar case, the prediction is used to the determine the correct Voronoi cell 935 in which the universally quantized measurements belonged before universal quantization. There are several ways to select the closest Voronoi cell consistent with the received label and closes to the predicted measurements. In a preferred embodiment, the prediction p is quantized to the closest lattice point $$p_q = D_3\left(\frac{p}{\Delta}\right),$$

and then universally quantized to obtain $p_q^{uni}=p_q \mod 2^B$. Then, $p_q^{uni}$ is subtracted from $p_q$, in order to determine a search region for the consistent label. The goal is to choose the region that is consistent with the universally quantized measurements and closest to the prediction, as shown in FIG. 6 for the 2D lattice. For the $D_3$ lattice, there are 27 neighbouring points generated as:

$$c_i = p_q - p_q^{uni} + s_i, \quad (13)$$

where $s_i$ are all the possible combinations of elements 0, $2^B$, $-2^B$ in a three-dimensional vector.

Finally, the estimated reconstruction point is:

$$\hat{y} = (c_{\hat{i}} + y_q)\Delta \quad (14)$$

where $$\hat{i} = \arg\min_i \; \|\frac{p}{\Delta} - (c_i + y_q)\| \quad (15)$$

Depending on the quality of the prediction and on the chosen value of B and $\Delta$, prediction errors might be more or less frequent. Thus, the recovered quantized measurements can be modeled as $$\hat{y} = Ax + w + e + v \quad (16)$$

where v is the quantization error and e is a vector with elements drawn from a finite alphabet of integer multiples of $\Delta 2^B$ capturing the decoding errors.

Given a good prediction and suitable values of $\Delta$, then e tends to be group-sparse. Furthermore, the encoder might include information on e which can be used to correct some or all of the errors and reset the corresponding coefficients of e to 0. Here, $\mathcal{S}$ denotes the set of labels of the groups containing known errors that have not been corrected, typically of order 2 or higher.

Consistency with the quantization lattice are enforced in the reconstruction program. However, the Voronoi regions of the $D_3$ lattice are dodecahedra which can make the decoding quite complex. An approximation is therefore used, where the dodecahedra are replaced by spheres of radius $\Delta$.

To recover 970, the image 960, the decoder uses the recovered measurements, aided by the image prediction. Specifically, recovery solves a weighted TV minimization with consistent reconstruction:

$$\hat{x} = \arg\min_x WTV(X) + \quad (17)$$

$$\lambda f(\Phi x) \text{ s.t. } \|y_{\mathcal{G}_i} - (\Phi x + w)_{\mathcal{G}_i}\| \le \Delta \text{ if } \mathcal{G}_i \notin \mathcal{S},$$

where WTV(•) is the isotropic weighted total variation $$WTV(x) = \sum_{i,j} \sqrt{W_{i,j}^{(x)}(X_{i,j} - X_{i-1,j})^2 + W_{i,j}^{(y)}(X_{i,j} - X_{i,j-1})^2},$$

$f(\bullet)$ penalizes decoding errors using a penalty with a mixed $\ell_1/\ell_2$ norm, due to the group-sparsity of the errors, $$f(\Phi x)= \Sigma_{\mathcal{G}_l \subseteq \mathcal{S}} \max\{\|_\nu y_{\mathcal{G}_{l_i}-(\Phi x+w)}\}_{\mathcal{G}_{l_i}}\|-\Delta, 0\} \qquad (18)$$

$W_{i,j}$ are weights that determine how gradients in each pixel of the image should be penalized, and $\mathcal{S}$ is the set containing the labels of the groups containing known errors that have not been corrected, if any.

In addition to resolving quantization ambiguities, the prediction obtained from the side information is also used to derive the weights $W_{i,j}$. Low weights are used when the gradient magnitude of the prediction is higher than a predefined threshold and high weights when the gradient is lower, a setting similar to the weighted $\ell_1$ minimization. The resulting model penalizes edges that do not exist in the prediction more than the ones that do exist. Since prediction is derived from the other spectral band, the model reinforces correlations between spectral bands, especially among the edges.

The function $f(\bullet)$ promotes data consistency for the part of the data in $\mathcal{S}$, i.e., where we suspect there is a decoding error. While a quadratic penalty is a more common data consistency penalty, a similar penalty for the universal scalar quantizer enabled the recovery of some decoding errors thanks to their sparsity. For example, in one embodiment, the penalty is a generalization to block-sparse vectors, as this is kind of decoding errors arising from vector universal quantization.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

For example, one embodiment is implemented using a non-transitory computer readable storage medium embodied thereon a program executable by a processor for performing a method. The method includes estimating a transmitted encoded value to produce an estimated value, wherein the estimating uses side information; locating, on a map of a multi-dimensional space of encoded values, a first cell enclosing the estimated value, wherein the map includes a plurality of cells partitioning the multi-dimensional space, such that each cell encloses a cluster of encoded values and quantizes the cluster of encoded values to a quantized encoded value, wherein each cell is identified by a label selected from a finite alphabet, such that multiple cells in the map are identified by the same label, and wherein the cells are labeled such that a pair of cells identified by the same label does not share a common boarder; receiving a label of a cell transmitted over a communication channel; selecting on the map a second cell that is closest to the first cell among cells having the transmitted label; and selecting a quantized value of the second cell as a decoded value of the signal.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A decoder, comprising:
    a memory storing a map of a space of encoded values, wherein the map includes a plurality of cells partitioning the space, such that each cell encloses a cluster of encoded values and quantizes the cluster of encoded values to a quantized encoded value, wherein each cell is identified by a label selected from a finite alphabet, such that multiple cells in the map are identified by the same label, and wherein the cells are labeled such that a pair of cells identified by the same label does not share a common boarder;
    a receiver to receive from an encoder a label of a cell enclosing an encoded value on the map of the multi-dimensional space; and
    a processor to estimate the encoded value using side information to produce an estimation of the encoded value, to select a cell identified by the received label on the map of the space that is the closest to the estimation of encoded value, and to determine the encoded value as the quantized encoded value of the selected cell.

2. The decoder of claim 1, wherein the space is a multi-dimensional space.

3. The decoder of claim 1, wherein the cells are arranged along a regular lattice.

4. The decoder of claim 1, wherein the space is a two-dimensional space and each cell in the map has a hexagonal shape.

5. The decoder of claim 1, wherein the space is a three-dimensional space and the cells are arranged along a regular three-dimensional lattice.

6. The decoder of claim 1, wherein the side information includes statistical similarity measures of the signal.

7. The decoder of claim 1, wherein the side information includes corrections to errors produced by determining the one or more missing significant bits.

8. The decoder of claim 7, wherein the corrections are determined at an encoder.

9. The decoder of claim 1, wherein the signal is a multispectral image.

10. The decoder of claim 1, wherein the signal is acquired by a radar system.

11. The decoder of claim 10, wherein the radar system is a synthetic aperture radar (SAR) system.

12. The decoder of claim 1, wherein the encoded values are generated by measuring a signal using a measurement matrix.

13. The decoder of claim 12, wherein dither is added to the measurements of the signal to generate the encoded values.

14. The decoder of claim 12, wherein the determined encoded value is used to reconstruct the signal.

15. The decoder of claim 14, wherein the reconstruction is preformed using one or combination of a convex optimization and a greedy algorithm.

16. A method for decoding an encoded value, comprising:
estimating a transmitted encoded value to produce an estimated value, wherein the estimating uses side information;
locating the estimated value on a map of a multi-dimensional space of encoded values, wherein the map includes a plurality of cells partitioning the multi-dimensional space, such that each cell encloses a cluster of encoded values and quantizes the cluster of encoded values to a quantized encoded value, wherein each cell is identified by a label selected from a finite alphabet, such that multiple cells in the map are identified by the same label, and wherein the cells are labeled such that a pair of cells identified by the same label does not share a common boarder;
receiving a label of a cell transmitted over a communication channel;
selecting on the map a cell that is closest to the estimated value among cells having the transmitted label; and
selecting a quantized value of the cell as a decoded value, wherein steps of the method are performed by a processor of a decoder.

17. The method of claim 16, wherein the space is a two-dimensional space and each cell in the map has a hexagonal shape.

18. The method of claim 16, wherein the space is a three-dimensional space and the cells are arranged along a regular three-dimensional lattice.

19. The method of claim 16, further comprising:
reconstructing a signal using the decoded value to promote sparsity of the reconstructed signal, wherein the sparsity is weighted based on the side information.

20. An encoder, comprising:
a processor to determine an encoded value;
a memory storing a map of a multi-dimensional space of encoded values, wherein the map includes a plurality of cells partitioning the multi-dimensional space, such that each cell encloses a cluster of encoded values and quantizes the cluster of encoded values to a quantized encoded value, wherein each cell is identified by a label selected from a finite alphabet, such that multiple cells in the map are identified by the same label, and wherein the cells are labeled such that a pair of cells identified by the same label does not share a common boarder; and
a transmitter to transmit to a decoder a label of the cell enclosing the encoded value on the map of the multi-dimensional space.

* * * * *